United States Patent
Barnes et al.

(10) Patent No.: US 7,807,744 B2
(45) Date of Patent: Oct. 5, 2010

(54) ARCHITECTURAL COATING COMPOSITIONS CONTAINING SILICONE RESINS

(75) Inventors: Kathleen Barnes, Midland, MI (US); Stephanie Gathman, Midland, MI (US); David Plante, Midland, MI (US); Lori Stark-Kasley, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 88 days.

(21) Appl. No.: 11/886,559

(22) PCT Filed: Apr. 10, 2006

(86) PCT No.: PCT/US2006/013110

§ 371 (c)(1),
(2), (4) Date: Sep. 17, 2007

(87) PCT Pub. No.: WO2006/113183

PCT Pub. Date: Oct. 26, 2006

(65) Prior Publication Data

US 2009/0030111 A1    Jan. 29, 2009

Related U.S. Application Data

(60) Provisional application No. 60/672,253, filed on Apr. 18, 2005.

(51) Int. Cl.
*C08L 83/00* (2006.01)
*C08L 31/00* (2006.01)
*C09D 5/16* (2006.01)
*C08K 5/34* (2006.01)

(52) U.S. Cl. ........................ 524/506; 524/588; 524/556; 523/122; 525/100; 525/101

(58) Field of Classification Search ............ 523/122, 523/160, 161; 525/100, 101, 102, 103, 104, 525/105, 106
See application file for complete search history.

(56) References Cited

U.S. PATENT DOCUMENTS

| 4,446,259 | A | 5/1984 | Vasta |
| 4,648,904 | A | 3/1987 | DePasquale et al. |
| 4,877,654 | A | 10/1989 | Wilson |
| 5,300,327 | A | 4/1994 | Stark-Kasley et al. |
| 5,449,712 | A | 9/1995 | Gierke et al. |
| 5,681,892 | A * | 10/1997 | Weidner et al. ............... 525/58 |
| 5,695,551 | A | 12/1997 | Buckingham et al. |
| 6,323,268 | B1 | 11/2001 | Fisher et al. |
| 6,403,163 | B1 * | 6/2002 | Fisher et al. ................ 427/387 |
| 6,488,867 | B1 | 12/2002 | Matsumoto et al. |
| 6,492,459 | B1 | 12/2002 | Hager et al. |
| 6,531,229 | B1 * | 3/2003 | Franzoni et al. ............. 428/447 |
| 6,623,399 | B2 | 9/2003 | Fey et al. |
| 2003/0129419 | A1 | 7/2003 | Chen |
| 2003/0144364 | A1 | 7/2003 | Schmuck et al. |
| 2007/0148115 | A1 | 6/2007 | Cook et al. |

FOREIGN PATENT DOCUMENTS

| EP | 1069148 | 1/2001 |
| JP | 7258549 | 10/1995 |
| JP | 2000063757 | 2/2000 |
| JP | 2000169710 | 6/2000 |
| JP | 2004018780 | 1/2004 |

OTHER PUBLICATIONS

The Kirk-Othmer Encyclopedia of Chemical Technology, vol. 1, 4th Edition, John Wiley & Sons, pp. 314-343, (1991).
The Kirk-Othmer Encyclopedia of Chemical Technology, vol. 17, 4th Edition, John Wiley & Sons pp. 1049-1069, (1996).

* cited by examiner

*Primary Examiner*—Vasu Jagannathan
*Assistant Examiner*—Alexander C Kollias
(74) *Attorney, Agent, or Firm*—Alan Zombeck

(57) ABSTRACT

An architectural coating composition is disclosed containing a silicone resin, an acrylic resin, a carrier, a pigment, a surfactant, and an optional additive. The silicone resin is a DT silicone resin, an MQ silicone resin, or an MTQ silicone resin. The carrier is water, a water compatible carrier, or a mixture of water and a water compatible carrier. The surfactant is an anionic surfactant, a nonionic surfactant, or a mixture of anionic surfactants and nonionic surfactants.

3 Claims, No Drawings

ARCHITECTURAL COATING COMPOSITIONS CONTAINING SILICONE RESINS

CROSS REFERENCE TO RELATED APPLICATIONS

This application is a U.S. national stage filing under 35 U.S.C. §371 of PCT Application No. PCT/US06/013110 filed on Apr. 10, 2006, currently pending, which claims the benefit of U.S. Provisional Patent Application No. 60/672253 filed Apr. 18, 2005 under 35 U.S.C. §119 (e). PCT Application No. PCT/US06/013110 and U.S. Provisional Patent Application No. 60/672253 are hereby incorporated by reference.

BACKGROUND OF THE INVENTION

This invention is directed to architectural coating compositions containing certain silicone resins. In particular, it is directed to paints commonly referred to as architectural coatings and/or house paints and stains.

Paints are most often described according to the type of binder or solvent employed. For example, acrylic and alkyd describes the type of binder or resin system used in the paint, whereas latex or water, and oil-based or solvent-based, refers to the type of solvent used in the paint formulation. In the paint industry, the term solvent typically refers to organic hydrocarbon solvents, and does not include water. Most paints are made up of four basic components including a binder or resin, pigments, a solvent, and other additives. Once the paint is applied to a surface, the solvent begins to evaporate, while the binder, pigments, and additives remain on the surface, and form a hard, dry, solid film.

Some examples of binders and resins used in paints include latex emulsions based on acrylic copolymers, vinyl copolymers, as well as styrene copolymers. The type of pigments encompasses organic and inorganic colored pigments, as well as inorganic extender and filler pigments. Additives include compositions such as thickeners, biocides, driers, co-solvents, pigment dispersants, surfactants, defoamers, and other specialty compositions, all present in relatively low levels in the paint formulation.

Water based paints primarily based on acrylic emulsions represent over 70 percent of the architectural coating market. The acrylic latex emulsion based paints are commonly recognized as being the most durable paints for exterior use. Exterior grade paints typically contain copolymers of methyl methacrylate and butyl acrylate or 2-ethylhexyl acrylate. The appearance or finish of paint is a function of its so-called pigment volume concentration (PVC), which ranges from a high of 75 for interior flat paints, to a low of 15 for high gloss enamel. In between are the exterior flat, exterior sheen, interior satin, and semi-gloss finishes. The focus of the present invention is acrylic emulsion containing house paints for interior and exterior applications to wood and drywall.

Silane monomers have been used in water repellent treatments for application to concrete, brick, and wood. They have also been added to acrylic emulsions to improve the weatherability of paints and stains. In such cases, phenyl based silane monomers have been used, or the resins formed by pre-reacting these monomers, i.e., hydrolyzing, since they are considered as being more compatible with the organic moiety of organic resin binders. However, when used as an additive in architectural paint and stains, the water repellent properties of the paint are not consistently improved, meaning they may or may not improve the organic resin binder in the paint. Improving the water repellency of the paint or stain can decrease the water ingress into the substrate, thus increasing the longevity of both the paint and the substrate, and is highly desirable.

It is known that the addition of resins and resin emulsions to paint can improve the water repellent properties across many different types and brands of paint, from flat and high gloss paints to stains. Two other properties that must also be considered when incorporating additives to paints and stains are dirt pick-up and gloss. Silane monomers tend to increase the dirt pick up of the paint, whereas DT, MQ, and MTQ based silicone resins tend to decrease or not affect the dirt pick up of paints. While resins such as MQ type silicone resins can decrease the gloss of paint, since they can form rough films and therefore increase the defects in paints, the MQ type silicone resins can be bodied to reduce the OH content in the resin, that will result in films that have improved gloss, and therefore don't effect the gloss of the final paint.

The DT, MQ, and MTQ silicone resins herein can be emulsified and added to paints as an additive. In addition, they can be added to the resin binder used to make paints before its emulsified and formulated into a paint. When added to an architectural paint, the water repellent properties are improved, in addition to positive effects on dirt pick-up without affecting gloss.

While certain silicone resins have been used in acrylic polymer containing paint compositions such as U.S. Pat. No. 4,446,259 (May 1, 1984), the silicone resins are $D^{MePh}T^{Ph}$ type silicone resins, and have the disadvantages noted above. As regards the '259 patent in particular, the paint composition therein containing glycidyl methacrylate is not intended for application to the exterior and interior of homes, but is specially formulated as a paint composition having high heat resistance, i.e., 100-200° C. and above, suitable for application to metal substrates such as pipes, tanks, stacks, and reactors, in large industrial plants and refineries. In addition, it's a solvent-based paint composition, in contrast to the present invention that's an aqueous emulsion based paint composition containing a surfactant.

BRIEF SUMMARY OF THE INVENTION

The invention is directed to an architectural coating composition suitable as a house paint for application to wood and drywall surfaces. The coating composition contains a silicone resin, an acrylic resin, a carrier, a pigment, a surfactant, and optional additives. The silicone resin can be a DT silicone resin, an MQ silicone resin, or an MTQ silicone resin. The carrier is water, a water compatible carrier such as an alcohol, a glycol ether, and a polyglycol, or a mixture of water and a water compatible carrier. The surfactant is an anionic surfactant, a nonionic surfactant, or a mixture of anionic surfactants and nonionic surfactants. These and other features of the invention will become apparent from a consideration of the detailed description.

DETAILED DESCRIPTION OF THE INVENTION

The Silicone Resin

As used herein, the symbols M, D, T, and Q represent the functionality of the structural units of polyorganosiloxanes, including organosilicon fluids, rubbers (elastomers), and resins, particularly resins according to this invention. These symbols are used in accordance with the established understanding in the silicone industry. M represents the monofunctional unit $R_3SiO_{1/2}$; D represents the difunctional unit $R_2SiO_{2/2}$; T represents the trifunctional unit $RSiO_{3/2}$; and Q represents the tetrafunctional unit $SiO_{4/2}$. R for purposes of this invention represents an alkyl group containing from one to eight carbon atoms, i.e., methyl, ethyl, propyl, isopropyl, butyl, isobutyl, pentyl, hexyl, heptyl, octyl, and isooctyl. The structural formula of these units is shown below.

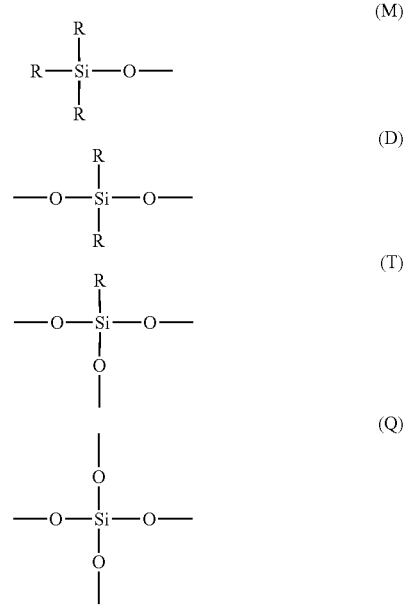

The silicone resins used herein are of the types identified as DT, MQ, and MTQ. Thus, the DT silicone resin herein contains units of the formulas $R_2SiO_{2/2}$ and $R'SiO_{3/2}$; the MQ silicone resin herein contains units of the formulas $R_3SiO_{1/2}$ and $SiO_{4/2}$; and the MTQ silicone resin herein contains units of the formulas $R_3SiO_{1/2}$, $R'SiO_{3/2}$, and $SiO_{4/2}$, wherein R and R' are an alkyl groups containing from one to eight carbon atoms, such as the methyl, ethyl, propyl, isopropyl, butyl, isobutyl, pentyl, hexyl, heptyl, octyl, and isooctyl groups.

In particular, (i) the DT silicone resin contains 5-60 mole percent of units of the formula $R_2SiO_{2/2}$ and 40-95 mole percent of units of the formula $R'SiO_{3/2}$; (ii) the MQ silicone resin contains units of the formulas $R_3SiO_{1/2}$ and units of the formula $SiO_{4/2}$ in a ratio of 0.5:1 to 1.5:1; and (iii) the MTQ silicone resin contains units of the formula $(R_3SiO_{1/2})_a$, units of the formula $(R'SiO_{3/2})_b$, and units of the formula $(SiO_{4/2})_c$, where a has a value of 0.05-0.5, b has a value greater than zero and preferably a value of 0.05-0.75, c has a value of 0.05-0.6, and the value of a+b+c is equal to one. R and R' is the same as defined above. For the MTQ silicone resin, R' is most preferably the propyl group.

Silicone resins such as these and methods for their manufacture are generally known, and reference may be had to U.S. Pat. No. 5,695,551 (Dec. 9, 1997); U.S. Pat. No. 6,323,268 (Nov. 27, 2001); U.S. Pat. No. 6,623,399 (Sep. 23, 2003); and U.S. Provisional Application Ser. No. 60/541,002, filed Feb. 2, 2004; all of which are assigned to the same assignee as the present invention. The architectural coating compositions herein contain 1-10 percent by weight of the silicone resin based on the total weight of the coating composition including the carrier.

The Acrylic Resin

Acrylic resins and acrylic latex emulsions containing acrylic resins are generally known in the art, and reference may be had to *The Kirk-Othmer, Encyclopedia of Chemical Technology*, Volume 1, John Wiley & Sons, Pages 314-343, (1991), ISBN 0-471-52669-X (v. 1). The architectural coating compositions herein contain 10-50 percent by weight of the acrylic resin based on the total weight of the coating composition.

Some examples of ethylenically unsaturated monomers that can be used to form the acrylic resins herein include alkyl methacrylates having 1-12 carbon atoms such as methyl methacrylate, ethyl methacrylate, butyl methacrylate, hexyl methacrylate, 2-ethylhexyl methacrylate, nonyl methacrylate, lauryl methacrylate, cyclohexyl methacrylate, isodecyl methacrylate, propyl methacrylate, phenyl methacrylate, and isobornyl methacrylate; alkyl acrylates having 1-12 carbon atoms in the alkyl group such as methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, cyclohexyl acrylate, isodecyl acrylate, phenyl acrylate, and isobornyl acrylate; styrene, alkyl substituted styrene such as α-methyl styrene, t-butyl styrene, and vinyl toluene.

The Carrier

The preferred carrier herein is water. In some case, it may be desirable to use a water compatible carrier such as an alcohol comprising isopropyl alcohol for example; a glycol ether such as diethylene glycol butyl ether or propylene glycol methyl ether; or a polyglycol such as ethylene glycol or propylene glycol. A carrier comprising a mixture of water and a water compatible carrier can also be used. The architectural coating compositions herein contain 25-80 percent by weight of the carrier based on the total weight of the coating composition.

The Pigment

The architectural coating compositions herein contain 0.5-40 percent by weight of a pigment based on the total weight of the coating composition. Pigments suitable for use in architectural coating compositions are generally known in the art, and reference may be had to *The Kirk-Othmer Encyclopedia of Chemical Technology*, Volume 17, John Wiley & Sons, Pages 1049-1069, (1996), ISBN 0-471-52686-X. Inorganic or organic color pigments can be used, although inorganic pigments are preferred, because of their relatively low cost and better opacifying ability. In addition, the exterior durability properties of inorganic color pigments are generally better than those of organics. White, black, and other color pigments, such as titanium dioxide can be used. Extender pigments such as calcium carbonate, talc, clay, and silicon dioxide, can also be employed.

The Surfactant

While any anionic or nonionic surfactant can be used to emulsify the resins, most preferred is a co-surfactant mixture of a high HLB nonionic surfactant and a lower HLB nonionic surfactant. In particular, the lower HLB nonionic surfactant should have an HLB value of less than 14, preferably less than 12. The high HLB nonionic surfactant should have an HLB value of greater than 14, and preferably greater than 15. Suitable nonionic surfactants are ethoxylated alcohols. TERGITOL® surfactants from The Dow Chemical Company, Midland, Mich., have been found to be especially useful herein. In particular, TERGITOL® TMN-6 with an HLB of 13.1, TERGITOL® 15-S-5 with an HLB of 10.6, TERGITOL® 15-S-20 with an HLB of 16.4, and TERGITOL® 15-S-30 with an HLB of 17.5, are most preferred.

In addition, the following surfactants have been found to be especially useful herein, i.e., SPAN 20, a nonionic surfactant with an HLB of 8.6, the tradename of ICI Surfactants, Wilmington, Del., for Sorbitan Monolaurate; ARALTONE T, a nonionic surfactant with an HLB of 9.0, the tradename of ICI Surfactants, Wilmington, Del., for polyoxyethylene 40 sorbitol septaoleate, i.e., PEG-40 Sorbitol Septaoleate; and G-4280, a nonionic surfactant with an HLB of 19.1, the tradename of ICI Surfactants, Wilmington, Del., for polyoxyethylene 80 sorbitan laurate, i.e., PEG-80 Sorbitan Laurate.

Suitable anionic surfactants include sulfonated and sulfated alkyl, aralkyl and alkaryl anionic surfactants; alkyl succinates; alkyl sulfosuccinates and N-alkyl sarcosinates. Representative surfactants are the sodium, magnesium, ammonium, and the mono-, di- and triethanolamine salts of alkyl and aralkyl sulfates, as well as the salts of alkaryl sulfonates. The alkyl groups of the surfactants generally have a total of from about twelve to twenty-one carbon atoms, may be unsaturated, and are preferably fatty alkyl groups. The sulfates may be sulfate ethers containing one to ten ethylene oxide or propylene oxide units per molecule. Preferably, the sulfate ethers contain two to three ethylene oxide units.

Representative anionic surfactants include sodium lauryl sulfate, sodium lauryl ether sulfate, ammonium lauryl sulfate, triethanolamine lauryl sulfate, sodium $C_{14-16}$ olefin sulfonate, ammonium pareth-25 sulfate, sodium myristyl ether sulfate, ammonium lauryl ether sulfate, disodium monooleamidosulfosuccinate, ammonium lauryl sulfosuccinate, sodium dodecylbenzene sulfonate, triethanolamine dodecylbenzene sulfonate, and sodium N-lauroyl sarcosinate.

Suitable anionic surfactant products are sold under tradenames or trademarks such as EMCOL® and WITCONATE™ by Witco Corporation, New York, N.Y.; MARLON by Huls America Incorporated, Piscataway, N.J.; AEROSOL by American Cyanamid Company, Wayne, N.J.; and HAMPOSYL by W.R. Grace & Company, Lexington, Mass. There may also be employed sulfates of ethoxylated alcohols sold under the tradename STANDAPOL by Henkel Corporation, Ambler, Pa.

Other representative surfactants including anionic and nonionic surfactant that can be used, are enumerated in detail in the '551 and '268 patents referred to above, to which reference may be made for specific examples of appropriate surfactants, and/or combinations of surfactants that can be employed. The architectural coating compositions herein contain 0.5-10 percent by weight of the surfactant based on the total weight of the coating composition, in order to emulsify the silicone resin and the acrylic resin in the carrier.

Additives

While the principal components of the house paints herein are the silicone resin, the acrylic resin, the carrier, the pigment(s), and the surfactant, other optional additives may be included in the architectural coating compositions herein. The additives most commonly used in latex paints include thickeners, pigment dispersants, defoamers, biocides, and amines or other chemicals for pH adjustment. The architectural coating compositions herein contain 0-5 percent by weight of the additive(s) based on the total weight of the coating composition;

Preparation

The architectural coating compositions herein are prepared by simply mixing together the several components. Preferably, the architectural coating compositions are prepared by pre-emulsifying the silicone resin and the acrylic resin in the carrier, prior to adding the other components. The components of the architectural coating compositions are used in the following amounts:

1. 0.5-10 percent by weight of the silicone resin based on the total weight of the coating composition;
2. 10-50 percent by weight of the acrylic resin solids based on the total weight of the coating composition;
3. 20-80 percent by weight of the carrier based on the total weight of the coating composition;
4. 0.5-40 percent by weight of the pigment based on the total weight of the coating composition;
5. 0.5-10 percent by weight of the surfactant based on the total weight of the coating composition; and optionally
6. 0-5 percent by weight of the additive(s) based on the total weight of the coating composition.

EXAMPLES

The following examples are set forth in order to illustrate the invention in more detail.

Example 1

Reference

A blend of two silanes comprising 67 percent by weight of phenyltrimethoxysilane and 33 percent by weight of phenylmethyldimethoxysilane was used as a comparison (labeled as Example 1 comparison additive). The blend is commonly employed in acrylic emulsions as a binder for architectural paints to improve the weatherability of the paints. This silane blend was not emulsified before addition to the acrylic resin emulsion.

An MQ resin dispersed in decamethylcyclopentasiloxane (D5) was used as the silicone resin additive in Example 1-1, although MQ resins dispersed in toluene or other solvent can also be employed. A DT resin at 100 percent solids was used in Example 1-2 although a DT resin dispersed in a solvent can also be employed.

TABLE 1

| MQ and DT Resins | | |
| --- | --- | --- |
| Example | Weight Percent of Resin | Weight Percent of Solvent |
| 1-1 | 50 Percent MQ | 50 Percent D5 |
| 1-2 | 100 Percent $DT^{Me}$ | None |

Example 2

$MT^{Pr}Q$ Bodied Silicone Resins (Reference)

A MQ Resin dispersed in xylene at a level of 70.8 percent by weight of solids, propylsilsesquioxane resin dispersed in toluene at a level of 71.0 percent by weight of solids, xylene, and 1N KOH in water, was added to a 3-neck reaction flask, at the ratios shown in Table 2. Propylsilsesquioxane resin can be prepared by hydrolysis of propyltrichlorosilane. The 3-neck reaction flask was equipped with an agitator, a temperature probe, and a Dean Stark trap with an upper condenser. The Dean Stark trap was pre-loaded with xylene to insure that a 50 percent by weight of total solids was maintained. The contents of the flask were heated at the reflux temperature of 100-140° C. for at least 3 hours. The water was removed azeotropically from the Dean Stark Trap as it was formed. Heating of the flask was continued for 30 minutes after the water had been removed. The silicone resin was allowed to cool, and excess acetic acid was added to neutralize the KOH present in the flask. Salts were removed by passing the flask contents through a pressure filter. A solvent exchange between the aromatic solvents and decamethylcyclopentasiloxane was conducted by stripping the silicone resin under vacuum, and heating it on a rotary evaporator until a majority of the aromatic solvents had been removed. Decamethylcyclopentasiloxane was added and stripping was continued to remove any residual aromatic solvent.

TABLE 2

Bodied Silicone Resins

| Example | Wt % of MQ Resin | Wt % of T Resin | Wt % of Xylene | Wt % of 1N KOH solution in water | Wt % of Glacial Acetic Acid |
|---|---|---|---|---|---|
| 2-1 | 59.4 | 10.5 | 29.1 | 0.9 | 0.2 |
| 2-2 | 34.9 | 34.8 | 29.1 | 0.9 | 0.2 |
| 2-3 | 20.9 | 48.8 | 29.2 | 0.9 | 0.2 |
| 2-4 | 67.1 | 3.5 | 28.3 | 0.9 | 0.2 |
| 2-5 | 47.9 | 20.9 | 30.3 | 0.9 | 0.2 |

Example 3

MQ Bodied Silicone Resins (Reference)

A MQ Resin dispersed in xylene at a level of 70.8 percent by weight of solids, xylene, and 1N KOH in water, was added to a 3-neck reaction flask, at the ratios shown in Table 3. The 3-neck reaction flask was equipped with an agitator, a temperature probe, and a Dean Stark trap with an upper condenser. The Dean Stark trap was pre-loaded with xylene to insure that a 50 percent by weight of total solids was maintained. The contents of the flask were heated at the reflux temperature of 100-140° C. for at least 3 hours. The water was removed azeotropically from the Dean Stark Trap as it was formed. Heating of the flask was continued for 30 minutes after the water had been removed. The silicone resin was allowed to cool, and excess acetic acid was added to neutralize the KOH present in the flask. Salts were removed by passing the flask contents through a pressure filter. Example 3-1 was left in xylene, while Example 3-2 was solvent exchanged out of xylene into decamethylcyclopentasiloxane ($D_5$). This was carried out by stripping the silicone resin under vacuum while heating it on a rotary evaporator until a majority of the aromatic solvents had been removed. Decamethylcyclopentasiloxane was then added and stripping was continued to remove any residual aromatic solvent.

TABLE 3

Bodied MQ Silicone Resins

| Example | Wt % of Resin | Wt % of Xylene | Wt % of 1N KOH solution in water |
|---|---|---|---|
| 3-1 MQ in Xylene | 70.0 | 29.1 | 0.9 |
| 3-2 MQ in D5 | 69.9 | 29.0 | 0.9 |

Example 4

Reference

The silicone resins were characterized by NMR and GPC, and the results are shown in Table 4. In Table 4, the M and D units were $M^{Me}_3$ and $D^{Me}_2$ units, i.e., methyl. As shown in Table 4, the T units were $T^{Pr}$ and $T^{Me}$ units, i.e., propyl and methyl.

TABLE 4

NMR & GPC Characterization

| Example | NMR Characterization | Wt % OH | $M_n$ | $M_w$ | Polydispersity $M_w/M_n$ |
|---|---|---|---|---|---|
| 1-1 | $M_{0.43}Q_{0.57}$ | 3.7 | 4,010 | 14,700 | 3.7 |
| 1-2 | $D_{0.15}T^{Me}_{0.85}$ | | | | |
| 2-1 | $M_{0.374}Q_{0.529}T^{Pr}_{0.097}$ | 1.4 | 5,880 | 271,000 | 46.1 |
| 2-2 | $M_{0.248}Q_{0.341}T^{Pr}_{0.412}$ | 2.1 | 6,640 | 3,860,000 | 581.3 |
| 2-3 | $M_{0.419}Q_{0.548}T^{Pr}_{0.032}$ | 1.5 | 5,730 | 29,200 | 34.8 |
| 2-4 | $M_{0.330}Q_{0.440}T^{Pr}_{0.230}$ | 1.7 | 6,782 | 236,000 | 34.8 |
| 3-1 | $M_{0.43}Q_{0.57}$ | 1.7 | 5,180 | 15,470 | 3.0 |
| 3-2 | $M_{0.42}Q_{0.58}$ | 1.7 | 5,737 | 17,160 | 3.0 |

Example 4A

Emulsification of the Resins (Reference)

The silicone resins, either in a solvent or as a pure resin, were emulsified mechanically, using a co-surfactant package as described above. The active ingredient, i.e., the resin or the resin/solvent blend, was mixed mechanically with the lower HLB surfactant within the range 0.5-5 percent by weight based on the weight of the active ingredient, and with high HLB surfactant within the range of 0.5-7 percent by weight based on the weight of the active ingredient. Some formulations were then mixed mechanically with a small percentage of water within the range of 0.5-10 percent by weight based on the weight of the active ingredient, and then diluted to a total content of 60 percent by weight of the active ingredient. Other emulsions were made by creating a premix of the surfactants and water used to create a 60 percent by weight active ingredient, and then sheared mechanically under high pressure.

Example 5

The silicone resin emulsions as prepared in Example 4 were added to a variety of commercially available paints and stains and evaluated for their effect on water repellency, dirt pickup, and gloss. The paints and stains were all acrylic resin-based paints and stains. The paints and stains were compositions manufactured by The Behr Company, Santa Ana, Calif.; Valspar Corporation, Wheeling, Ill.; and Sherwin Williams Corporation, Chicago, Ill.

Water Repellency (WR) was evaluated on yellow pine cut according to ASTM D4446 "Standard Test Method for Anti-Swelling Effectiveness of Water Repellent Formulations and Differential Swelling of Untreated Wood When Exposed to Liquid Water Environments". The silicone resin additive was added to the paint in an emulsified form at a level of 2 percent by weight of the silicone resin (6% total emulsion level) based on the weight of the paint or stain composition. The results were compared to a control paint without a silicone resin additive. This test method simulates the yellow pine boards being rained on each day for 5 consecutive days.

According to this test protocol, the boards were dried for three days in a humidity chamber until they had reached their dry weight. All sides of the boards were coated with the paint and allowed to dry for 4 days. The painted boards were placed in a wind driven rain chamber. The rain chamber used in this Example was a laboratory model based on the procedure used in ASTM E514 Standard Test Method for Water Penetration and Leakage Through Masonry. The painted boards remained in the rain chamber for 1 hour and weighed within five minutes of removal from the rain chamber. The painted board was placed back in the humidity chamber until the next day when the procedure was repeated. The procedure was repeated 5 days in a row.

In Table 5, all of the results are shown in comparison to a control paint that did not contain a silicone resin additive. In Table 5, *WR-1, 3, 5 indicates Water Repellency at Day 1, Day 3, and Day 5. Positive results mean that the paint in the Example was better than the board painted with the control paint. Negative results mean that the paint in the Example was worse than the board painted with the control paint. Higher positive numbers mean that paint had very good water repellency.

TABLE 6

Color Change Due to Dirt Pick-up

| Example | Behr's Flat White |
|---|---|
| Control - No Additive | 5.52 |
| 1- Comparison - Silanes | 3.56 |
| 3-2 Bodied MQ in D5 | 1.88 |

Example 7

The effect on gloss was evaluated using paint applied to an aluminum panel to more accurately measure gloss. The gloss was measured on the control paint containing no silicone resin additive, which can be compared to the paint with the silicone resin additive. In this Example, the silicone resin emulsion was blended into the paint at a level of 2 percent by weight of the silicone resin, based on the weight of the paint. Higher numbers mean higher gloss.

TABLE 5

Water Repellency

| Example | Paint 1 - Behr's 4050 Flat White 1 % WR - 1, 3, 5* days | Paint 2 - Behr's 8050 High Gloss White % WR-1, 3, 5* | Paint 3 - Sherwin Williams Flat White 2 % WR-1, 3, 5* | Paint 4 - Valspar S.W Flat White | Solid Stain - Behr's 210 % WR-1, 3, 5* |
|---|---|---|---|---|---|
| 1-Comparison Silanes | 42, 44, NA | | −10, −16, NA | | 18.6, 21.0, NA |
| 1-1 MQ in D5 | 30, 28, NA | 91.8, 77.7, NA | | | 27.6, 26.2, NA |
| 1-2 DT$^{Me}$ Resin | | 49.2, 52.7, 53.1 | | | |
| 2-1 85:15 MQT$^{Pr}$ in D5 | 62.9, 54.1, 38.8 | | | 68.3, 41.5, 29.2 | 54.6, 64.0, 72.9 |
| 2-2 50:50 MQT$^{Pr}$ in D5 | 26.6, 9.1, 10 | | | | 39.5, 38.6, 42.5 |
| 2-3 95:5 MQT$^{Pr}$ in D5 | 35, 46, 36 | | 49, 59.0, NA | 67.2, 41.6, 30.5 | 40.6, 48.4, 49.8 |
| 2-4 70:30 MQT$^{Pr}$ in D5 | 12.8, 11.2, 19.0 | | | | 35.6, 46.0, NA |
| 3-1 Bodied MQ in Xylene | 48, 59, 53 | | 41, 49, 59 | | |
| 3-2 Bodied MQ in D5 | 35, 46, 36 | | 38, 49, 57 | | |

Example 6

Dirt Pickup Test

In the dirt pick up test, the paint was applied to an aluminum panel since this substrate can be more consistently controlled than wood that is a natural substrate. Therefore, the color change in the paint due to dirt pick-up can be more accurately measured. The paint was allowed to dry for more than 2 days after application. Part of the panel was exposed to dirt (the soiled portion), and the rest of the panel remained unexposed as the unsoiled portion of the panel. The color change of the soiled and unsoiled portions of the panel was determined using a calorimeter. In this Example, the silicone resin emulsion was added to the paint, and blended into the paint at a level of two percent by weight of the silicone resin, based on the weight of the paint. Lower numbers indicate less color change and therefore less soiling.

TABLE 7

60° Gloss Application Results - Effect of Additive on Gloss of Paint

| Example | Paint 2 - Behr's 8050 High Gloss White |
|---|---|
| Control | 67.37 |
| 1-1 Unbodied MQ in D5 | 48.80 |
| 2-5 MQT$^{Pr}$ in D5 | 65.83 |

Tables 5-7 show that silicone resin additives have advantages over silanes as paint additives in architectural coating compositions. Thus, the water repellency improvement of the silicone resins is consistent in different commercial paints, compared to the silanes that may or may not function in the selected paint. The silane based additive also increase the dirt pick-up of the paint, compared to the silicone resin that reduced the dirt pick-up. The silicone resins, especially the bodied resins, show an improved wetting and leveling of paints with reduced surface defects, and therefore do not effect gloss, especially in high gloss paints.

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. An architectural coating composition consisting of:
   (i) 0.5-10 percent by weight of a silicone resin based on the total weight of the architectural coating composition, wherein the silicone resin is a DT silicone resin containing 5-60 mole percent of units of the formula $R_2SiO_{2/2}$ and 40-95 mole percent of units of the formula $R'SiO_{3/2}$ or a MTQ silicone resin containing units of the formula $(R_3SiO_{1/2})_a$, units of the formula $(R'SiO_{3/2})_b$, and units of the formula $(SiO_{4/2})_c$, where a has a value of 0.05 to 0.5, b has a value of 0.05 to 0.75, c has a value of 0.05 to 0.6, with the proviso that the value of a +b +c is equal to one, wherein R is an alkyl group containing from one to eight carbon atoms and R' is propyl;
   (ii) 10-50 percent by weight of an acrylic resin based on the total weight of the architectural coating composition;
   (iii) 20-80 percent by weight of a carrier based on the total weight of the architectural coating composition, the carrier comprising water, a water compatible carrier, or mixtures thereof;
   (iv) 0.5-40 percent by weight of a pigment based on the total weight of the architectural coating composition;
   (v) 0.5-10 percent by weight of a surfactant based on the total weight of the architectural coating composition, the surfactant comprising an anionic surfactant, a nonionic surfactant, or mixtures thereof; and optionally
   (vi) 0-5 percent by weight of an additive based on the total weight of the architectural coating composition, wherein the additive is selected from the group consisting of a thickener, a pigment dispersant, a defoamer, a biocide, and amine compounds.

2. The architectural coating composition according to claim 1 wherein the water compatible carrier is an alcohol, a glycol ether, or a polyglycol.

3. A method for protecting interior and exterior wood surfaces of a house comprising applying to wood or drywall surfaces, the house paint according to claim 1.

* * * * *